June 12, 1962  J. W. SMITH  3,038,511
SPACING APPARATUS FOR PARALLEL BONDING OF BOARDS
Filed Dec. 21, 1959  4 Sheets-Sheet 1

INVENTOR.
John W. Smith
BY Stuckwells
Atty.

June 12, 1962 J. W. SMITH 3,038,511
SPACING APPARATUS FOR PARALLEL BONDING OF BOARDS
Filed Dec. 21, 1959 4 Sheets-Sheet 2

INVENTOR.
John W. Smith
BY Trubwell
atty.

June 12, 1962 J. W. SMITH 3,038,511
SPACING APPARATUS FOR PARALLEL BONDING OF BOARDS
Filed Dec. 21, 1959 4 Sheets-Sheet 3

INVENTOR.
John W. Smith
BY Struhlules
atty.

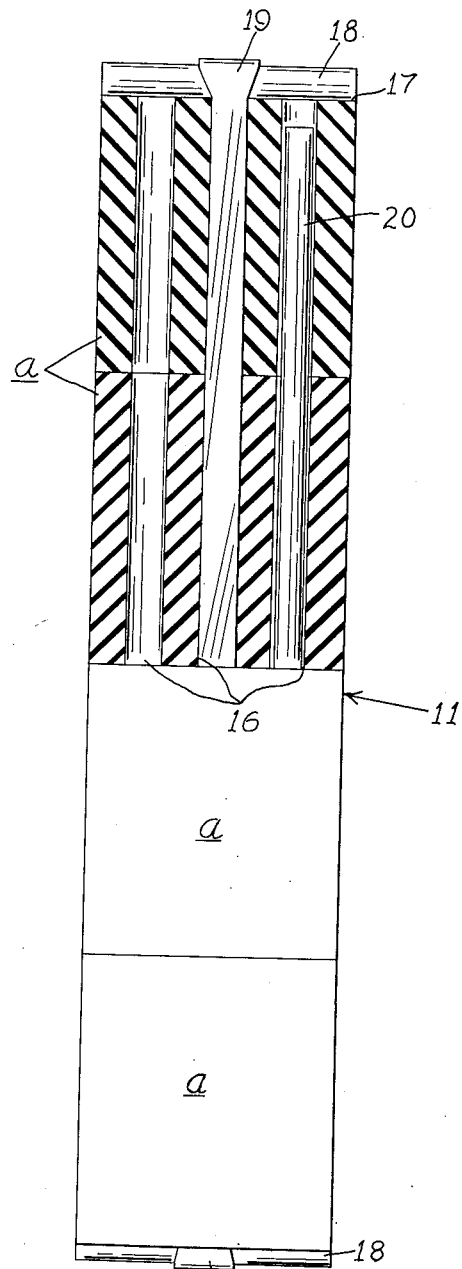

United States Patent Office 3,038,511
Patented June 12, 1962

3,038,511
SPACING APPARATUS FOR PARALLEL
BONDING OF BOARDS
John W. Smith, Lewiston, Idaho, assignor to Potlatch Forests, Inc., Lewiston, Idaho, a corporation of Delaware
Filed Dec. 21, 1959, Ser. No. 861,053
6 Claims. (Cl. 144—281)

The present invention relates to spacing apparatus for parallel bonding of boards where the adhesive is cured by high frequency field lines of force that are set up in paths that follow the planes of the adhesive across the boards. The United States Letters Patent No. 2,434,573 to Mann and Russell discloses and claims the method of parallel bonding.

It is the purpose of the present invention to provide an apparatus that enables the high frequency parallel bonding to be carried out effectively where the boards being bonded together are offset transversely with respect to each other, the boards being held in position by confining them in the direction of the adhesive plane and in a direction transverse thereto.

In a machine embodying the present apparatus there is provided an assembly mechanism wherein individual units, each comprising a central board and two outer boards that are offset crosswise and endwise, are stacked one unit upon another. The adhesive is placed only between the surfaces of the central board that are engaged by the two outer boards and the corresponding engaged surfaces of the outer boards. The machine embodies top and bottom platens with engaging cauls that are bars of insulating material such as well dried wood. The electrodes in the machine are aluminum strips backed up with bars of insulation which are movably mounted so they can be moved toward and away from each other to bring the electrodes into position.

More specifically it is a purpose of the present invention to provide spacing and guide members adapted to engage the sides and, where necessary, the ends of a stack of units and grip said units, said spacing and guide members being stretchable endwise and embodying spaced projections which overlap the surfaces of the boards in the plane of the adhesive that are not coated with adhesive, said spacing members providing stops controlling the electrode positioning with respect to the adhesive layers to be cured.

The nature and advantages of my invention will appear more fully from the following description and the accompanying drawings wherein a preferred form of the invention is disclosed. The details may however be varied within the scope of the invention as set forth in the claims.

In the drawings:

FIGURE 5 is a sectional view taken on the line 5—5 of FIGURE 3.

Figure 1:
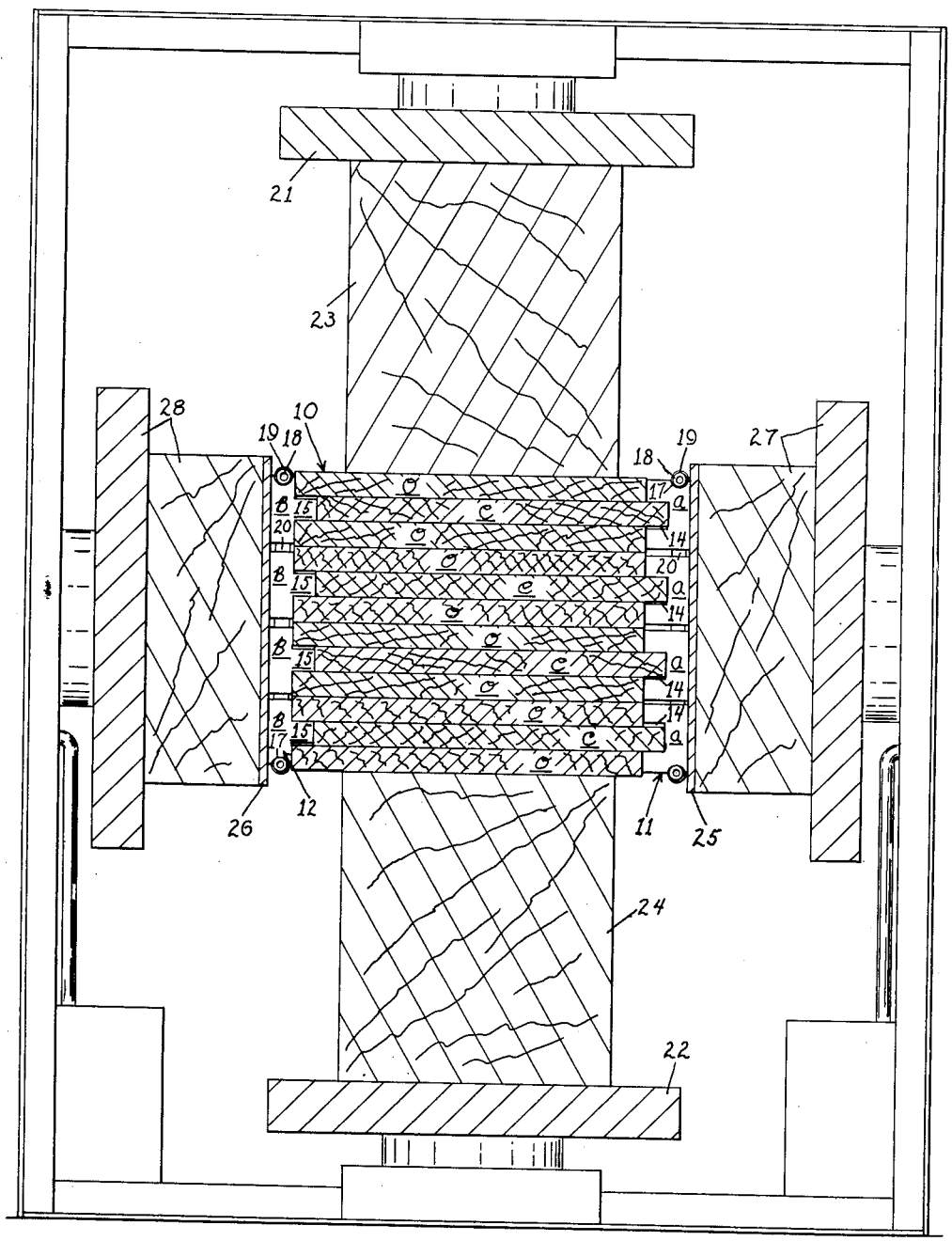
FIGURE 1 is a somewhat diagrammatic sectional view taken transversely of the machine to which my invention is applied and illustrating the application of my invention thereto.
Figure 2:
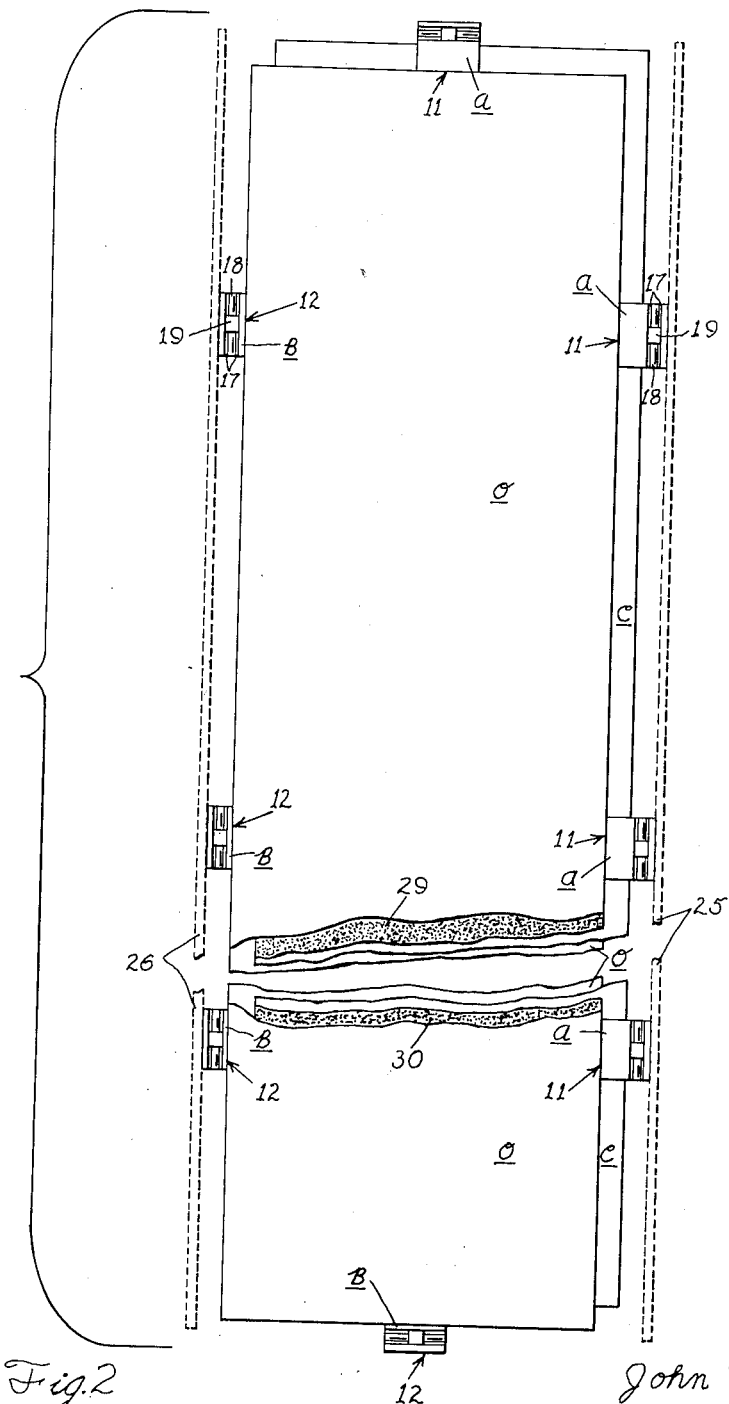
FIGURE 2 is a plan view of an assembled stack of timbers ready to have the adhesive cured, the electrodes being indicated by dotted lines.
Figures 3, 4:
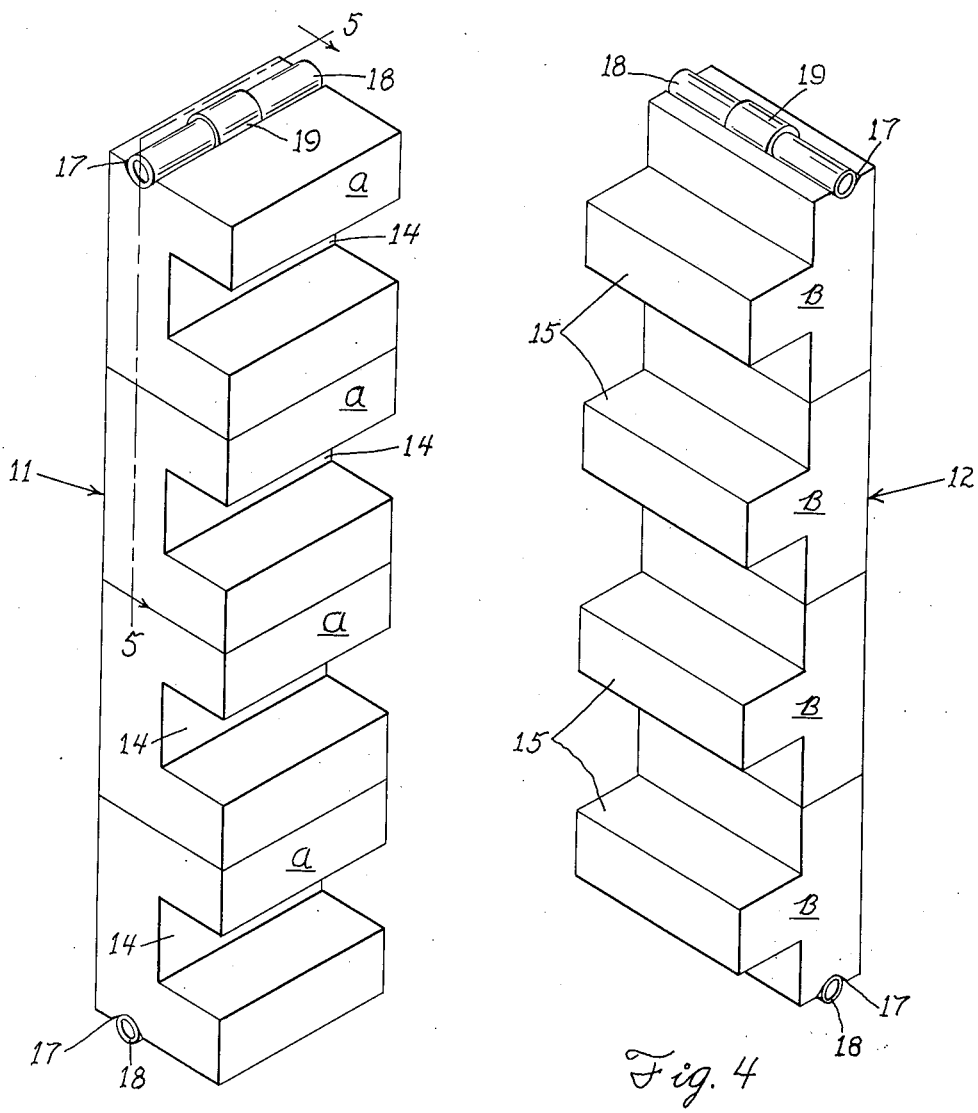
FIGURE 3 is an enlarged perspective view of a spacing member that is applied to one side of a stack of units and embodying my invention.
FIGURE 4 is an enlarged perspective view of a spacing member that is applied to the other side of the stack of units.

In the making of the laminated timbers as shown in FIGURES 1 and 2, the three boards which make up each laminated timber are usually assembled together by applying adhesive to both sides of a center board leaving a portion of each face adjacent to one edge of the board free of adhesive. This board is then sandwiched between the other two boards of like width and length so that the uncoated portion of the center board projects beyond the side edges of the other two boards. The opposite side edges of the outer boards project beyond the corresponding side edge of the center board. There is no adhesive on any of the exposed faces of the three boards. The center board may be of the same thickness as the outer boards or of a different thickness.

The adhesive used must be an economical one and of the exterior type in order for the units to be useable under all conditions of exposure. A thermo-setting phenolic resin adhesive satisfies these conditions. In order to adequately cure such an adhesive it must be heated to a relatively high temperature. The patent hereinbefore referred to discloses a method whereby a high frequency electric charge can be used for di-electric heating and curing the adhesive. In the application of this method to curing of the adhesive in laminated timbers of the character just described difficulties have arisen in obtaining adequate cure of the several layers of adhesive, particularly when a plurality of units of laminated timbers are to be cured at once. In order to make economic use of the high frequency parallel bonding simultaneous curing of a stack of the units is desirable. The several boards need to be pressed together tightly and held accurately in their staggered overlapped position before and during the di-electric heating. The electrodes can thus be spaced properly with respect to the adhesive areas between the center board of each timber and its adjacent offset boards.

A stack of several three board units is laid up, one unit on top of the other. Such a stack appears at 10 in cross section in FIGURE 1 where the center boards are indicated by the letter C and the outer boards by the letter O. The several boards are temporarily held together in proper relation by a plurality of spacing guide members 11 and 12. As shown in FIGURE 2 these members 11 and 12 are applied to the sides of the stacks at intervals of a few feet. The ends of the stack are also secured by members 11 and 12.

The spacing members 11 are all alike. Each member is made up of a plurality of channel shaped blocks A of a di-electric material. Each block has its channel 14 slightly wider than the thickness of the center board C. For example the channel is about ⅛ inch farther across than the standard thickness of the center board. This allows for variations in board thickness and failure of boards to be flat against each other due to warpage when they are stacked together.

The spacing members 12 are all alike. Each member 12 is made up of a series of T-shaped blocks B. The rib 15 of each block is slightly less in thickness than the standard thickness of the center board C. For example the rib 15 is about ¹⁄₁₆ inch thinner than the board C. This permits free insertion of the rib 15 between two outer boards O of an assembled group of three boards.

As seen in FIGURE 1, the overall thickness of each spacing member 11 or 12 is less than the total thickness of the board assemblies being glued. This fact insures free compression of the assemblies without restriction due to the members 11 or 12. It does so by allowing free clearance between members 11 and 12 and each surface of the boards in the assemblies.

The blocks A of the members 11 and the blocks B of the members 12 are resiliently held together by providing each block A and B with a plurality of apertures 16 that extend parallel to the back faces of the blocks and go through the blocks behind the channels 14 and ribs 15 extending at right angles to the channels and ribs. As shown the blocks A and B have three such apertures therein. The top and bottom blocks A of the member 11 and the top and bottom blocks of the number 12 are grooved as indicated at 17 to receive a hollow rod 18, which is of a di-electric material similar to that of the blocks. A resilient band member 19 of rubber or other suitably resilient di-electric material passes through the center apertures in the blocks of each member 11 and 12 and around the rods 18 and is stretched so as to yieldingly urge the blocks together. The other apertures are used to receive stiff rods 20 like the rods 18 to keep the blocks aligned. In the drawings only one rod 20 is shown in place, but the other aperture in each block may receive a like rod 20.

The construction of the members 11 and 12 just described provides a series of complementary spacing members which are placed on the assembled stack opposite each other, as illustrated in FIGURE 2 of the drawings, at intervals throughout the length of the stack and at the ends of the stack. The stack thus held by the di-electric spacing members is then moved into the curing press illustrated diagrammatically in FIGURE 1. The upper and lower press heads 21 and 22 are provided with beams 23 and 24 of wood or similar di-electric to engage the stack. The stack is first pressed lightly then electrodes 25 and 26 are closed against the spacing members 11 and 12 by their respective press heads 27 and 28. The press heads 21 and 22 then are used to press the assembled stack of boards together tightly and hold them while the electrodes are energized to cure the adhesive, (indicated at 29 and 30 in FIGURE 2) between the center boards C and outer boards O.

The spacing members 11 and 12 function to hold the several boards in the stack. They also serve to effect proper spacing of the electrodes with respect to the adhesive layers which must be cured by di-electric heating. These spacing members have made it possible to cure phenolic resin adhesives in the difficult assembly where the boards are staggered with respect to each other. The spacing members must be of a good di-electric material. Wood, ceramics, and high di-electric constant plastic compositions have been used successfully. The blocks must be free to adjust to the peculiarities of boards, i.e. thickness, irregularities and warping tendencies and yet they should present a substantially straight flat face to the electrodes. The construction described hereinbefore provides these characteristics.

Having described my invention, I claim:

1. An apparatus for laterally spacing a plurality of paral'el boards arranged in a stack containing a series of board assemblies wherein adjacent edges of the boards are offset laterally from one another within the assemblies, comprising a plurality of spacing members equal in number to the number of assemblies, each of said spacing members being formed from a rectangular block of di-electric material and having a thickness less than the thickness of each board assembly and being formed with laterally spaced inner and outer surfaces, the outer surface being planar, the inner surface being shaped complementary to the contour of the offset edges of a single assembly, rigid means freely inserted through said spacing members parallel to said outer surfaces adapted to a'ign said plurality of spacing members and resilient means connecting said plurality of spacing members adapted to urge adjacent spacing members toward each other, whereby said plurality of spacing members may be clamped onto the stack of boards with the inner surfaces of the spacing members abutting the board edges.

2. In an apparatus for high frequency curing of adhesive between a plurality of parallel adjacent layers of boards arranged in a stack containing a series of board assemblies wherein boards of each assembly are laterally offset from one another thereby forming a tongue configuration at one side of each assembly and a groove configuration at the opposite side of each assembly and including first pressure means adapted to act upon the boards perpendicularly with respect to the layers, second pressure means adapted to act upon the boards in a transverse direction, and plate electrode means between the second pressure means and the boards, wherein the adjacent layers of boards are offset transversely from one another; the improvement comprising spacer means held between the electrode means and the boards by the action of the second pressure means, said spacer means comprising a plurality of block spacing members aligned in groups, each group composed in number equal to the number of assemblies in the stack, the groups being spaced along the offset edges of the stack at intervals, each block spacing member having a thickness along the stack which is less than the thickness of a single board assembly, each block member also being formed with a plane outer surface parallel to the board edges, the inner surfaces of the block spacing members at said one side of the assemblies having formed thereon a groove configuration adapted to abut the offset edges of the assembly tongue configurations, the inner surfaces of the block spacing members at said opposite side of the assemblies having formed thereon a tongue configuration adapted to abut the offset edges of the assembly groove configurations, first aperture means cut through each block spacing member between the inner surface configurations and the outer surfaces, first rigid rod means inserted through said first aperture means in each group to maintain the block spacing members of each group in alignment, second aperture means cut through each block spacing member between the inner surface configurations and the outer surfaces, a groove cut on the upper and lower surfaces of each group along a line defined by said first and second aperture means, second rigid rod means located in each groove, and resilient band means stretched between said second rigid rod means in each group through said second aperture means adapted to urge the block spacing members of each group together to enable the groups to be yieldingly clamped to the sides of the stack.

3. An apparatus for laterally spacing a plurality of parallel boards arranged in a stack containing a series of board assemblies wherein adjacent edges of the boards are offset laterally from one another within the assemblies, comprising a plurality of spacing members equal in number to the number of assemblies, each of said spacing members being formed from a rectangular block of di-electric material and having a thickness less than the thickness of each board assembly and being formed with laterally spaced inner and outer surfaces, the inner surface being shaped complementary to the contour of the offset edges of a single assembly, rigid means operatively connecting said spacing members adapted to align said plurality of spacing members with respect to one another and resilient means connecting said plurality of spacing members adapted to urge adjacent spacing members toward each other, whereby said plurality of spacing members may be clamped onto the stack of boards with the inner surfaces of the spacing members abutting the board edges.

4. An apparatus for laterally spacing a plurality of parallel boards arranged in a stack containing a series of board assemblies wherein adjacent edges of the boards are offset laterally from one another within the assemblies, comprising a plurality of spacing members equal in number to the number of assemblies, each of said spacing members being a block of di-electric material having a corresponding thickness less than the thickness of each board assembly, an inner surface on each block shaped complementary to the contour of the offset edges of a single assembly, and resilient yieldable means interconnecting said spacing members whereby said spacing members are independently positionable along the edges of the stack of board assemblies.

5. The apparatus as defined in claim 4 wherein said spacing members have an inner surface having a grooved configuration adapted to receive a single board edge in a groove, the thickness of each groove being in excess of the thickness of the board adapted to be received therein.

6. The apparatus as defined in claim 4 wherein said spacing members have an inner surface having a tongue configuration adapted to abut a single board edge, the thickness of each tongue being less than the thickness of the board adapted to be abutted thereby.

References Cited in the file of this patent

UNITED STATES PATENTS

| | | |
|---|---|---|
| 2,434,573 | Mann et al. | Jan. 13, 1948 |

FOREIGN PATENTS

| | | |
|---|---|---|
| 124,633 | Great Britain | Apr. 3, 1919 |
| 141,059 | Sweden | June 30, 1953 |
| 886,190 | Germany | Aug. 13, 1953 |
| 892,211 | Germany | Oct. 5, 1953 |